(12) United States Patent
Szymański et al.

(10) Patent No.: US 12,511,741 B2
(45) Date of Patent: Dec. 30, 2025

(54) METHOD OF DIAGNOSING DEGREE OF NEUROPATHY OF A NERVE BY DIFFUSION TENSOR MAPPING

(71) Applicants: Uniwersytet w Bialymstoku, Bialystok (PL); Uniwersytet Medyczny w Bialymstoku, Bialystok (PL)

(72) Inventors: Krzysztof Szymański, Bialystok (PL); Lukasz Labieniec, Bialystok (PL); Lukasz Lisowski, Wasilków (PL)

(73) Assignees: Uniwersytet w Bialymstoku, Bialystok (PL); Uniwersytet Medyczny w Bialymstoku, Bialystok (PL)

( * ) Notice: Subject to any disclaimer, the term of this patent is extended or adjusted under 35 U.S.C. 154(b) by 434 days.

(21) Appl. No.: 18/167,764

(22) Filed: Feb. 10, 2023

(65) Prior Publication Data
US 2024/0273713 A1  Aug. 15, 2024

(51) Int. Cl.
*G06T 7/00* (2017.01)
*A61B 5/00* (2006.01)
*A61B 5/055* (2006.01)
*G06T 19/20* (2011.01)

(52) U.S. Cl.
CPC .......... *G06T 7/0012* (2013.01); *A61B 5/055* (2013.01); *A61B 5/4058* (2013.01); *G06T 19/20* (2013.01); *G06T 2207/10088* (2013.01); *G06T 2207/30004* (2013.01); *G06T 2219/2012* (2013.01);
(Continued)

(58) Field of Classification Search
CPC ............ G06T 7/0012; G06T 19/20; G06T 2207/10088; G06T 2207/30004; G06T 2219/2012; G06T 2219/2016; G06T 2219/2021; G06T 2207/10092;
(Continued)

(56) References Cited

U.S. PATENT DOCUMENTS

| | | |
|---|---|---|
| 7,480,400 B2 | 1/2009 | Flipo et al. |
| 10,575,753 B2 | 3/2020 | Jara |
| 11,375,918 B2 | 7/2022 | Jara et al. |

(Continued)

FOREIGN PATENT DOCUMENTS

JP  2004-81657 A  3/2004

OTHER PUBLICATIONS

Winklewski PJ et al. A. Understanding the Physiopathology Behind Axial and Radial Diffusivity Changes—What Do We Know? Front Neurol. Feb. 27, 2018;9:92. doi: 10.3389/fneur.2018.00092. PMID: 29535676; PMCID: PMC5835085. (Year: 2018).*

(Continued)

*Primary Examiner* — Kathleen Y Dulaney
(74) *Attorney, Agent, or Firm* — Knobbe Martens, Olson & Bear, LLP

(57) ABSTRACT

A method of diagnosing degree of neuropathy of a nerve by diffusion tensor mapping includes acquiring diffusion tensor imaging (DTI) digital images of the nerve based on magnetic resonance data of the part of the body comprising the nerve, for each voxel in the DTI digital images calculating a diffusion tensor and finding eigenvalues of the diffusion tensor, selecting a region of interest in at least one of said DTI digital images, and calculating a threshold value of a cutoff parameter as the minimal value of the cutoff parameter for which a particular following cutoff condition is false for all pixels withing the region of interest.

12 Claims, 4 Drawing Sheets

(52) U.S. Cl.
CPC .............. *G06T 2219/2016* (2013.01); *G06T 2219/2021* (2013.01)

(58) Field of Classification Search
CPC . G06T 2207/20076; G06T 2207/30016; G06T 2207/30041; A61B 5/055; A61B 5/4058
USPC .......................................... 382/131; 702/85
See application file for complete search history.

(56) References Cited

U.S. PATENT DOCUMENTS

| | | | | |
|---|---|---|---|---|
| 2011/0074423 | A1* | 3/2011 | Krzyzak | G01R 33/56341 324/318 |
| 2015/0279029 | A1* | 10/2015 | Jensen | G06T 7/0012 382/131 |
| 2019/0150822 | A1* | 5/2019 | Wang | A61B 5/4088 |
| 2022/0346649 | A1* | 11/2022 | Kawabori | A61B 5/4848 |
| 2023/0221391 | A1* | 7/2023 | Bito | G01R 33/56341 324/307 |
| 2023/0355128 | A1* | 11/2023 | Song | G06T 7/0012 |
| 2024/0346657 | A1* | 10/2024 | Hardingham | G16H 20/70 |

OTHER PUBLICATIONS

Weipeng Zheng et al, Application of Diffusion Tensor Imaging Cutoff Value to Evaluate the Severity and Postoperative Neurologic Recovery of Cervical Spondylotic Myelopathy, vol. 118, 2018, pp. e849-e855. (Year: 2018).*

Basser et al., "In Vivo Fiber Tractography Using DT-MRI Data," Magnetic Resonance in Medicine, Oct. 2000, vol. 44, Issue 4, pp. 625-632.

Froeling, "QMRTools: a Mathematica Toolbox for Quantitative MRI Analysis," Journal of Open Source Software, Jun. 2019, vol. 4, No. 38, 1204.

Gerlach et al., "MRI-Derived Diffusion Parameters in the Human Optic Nerve and Its Surrounding Sheath during Head-down Tilt," npj Microgravity, Jun. 2017, vol. 3, No. 1, 18.

He et al., "Comparison of Multiple Tractography Methods for Reconstruction of the Retinogeniculate Visual Pathway Using Diffusion MRI," Human Brain Mapping, Aug. 2021, vol. 42, Issue 12, pp. 3887-3904.

Hofer et al., "Reconstruction and Dissection of the Entire Human Visual Pathway Using Diffusion Tensor MRI," Frontiers in Neuroanatomy, vol. 4, Issue 15, Apr. 2010, pp. 1-7.

Jenkinson et al., "FSL," NeuroImage, Aug. 2012, vol. 62, No. 2, pp. 782-790.

Liu et al., "A Resource for the Detailed 3D Mapping of White Matter Pathways in the Marmoset Brain," Nature Neuroscience, Feb. 2020, vol. 23, No. 2, 271-280.

Minati et al., "Physical Foundations, Models, and Methods of Diffusion Magnetic Resonance Imaging of the Brain: A Review," Concepts in Magnetic Resonance Part A, Sep. 2007, vol. 30, No. 5, 278-307.

Mukherjee et al., "Diffusion Tensor MR Imaging and Fiber Tractography: Technical Considerations," AJNR American Journal of Neuroradiology, May 2008, vol. 29, Issue 5, 843-852.

Mukherjee et al., "Diffusion Tensor MR Imaging and Fiber Tractography: Theoretic Underpinnings," AJNR American Journal of Neuroradiology, Apr. 2008, vol. 29, Issue 4, 632-641.

Odom et al., "ISCEV Standard for Clinical Visual Evoked Potentials: (2016 Update)," Documenta Ophthalmologica, Aug. 2016, vol. 133, pp. 1-9.

Potgieser et al., Accepted Manuscript of "The Role of Diffusion Tensor Imaging in Brain Tumor Surgery: A Review of the Literature," Clinical Neurology and Neurosurgery, Sep. 2014.

Rizzo et al., "Use of Magnetic Resonance Imaging to Differentiate Optic Neuritis and Nonarteritic Anterior Ischemic Optic Neuropathy," Ophthalmology, Sep. 2002, vol. 109, No. 9, 1679-1684.

Samson et al., "Development of a High-Resolution Fat and CSF-Suppressed Optic Nerve DTI Protocol at 3T: Application in Multiple Sclerosis," Functional Neurology, Apr. 2013, vol. 28, Issue 2, pp. 93-100.

Smith et al., "Tract-Based Spatial Statistics: Voxelwise Analysis of Multi-Subject Diffusion Data," NeuroImage vol. 31, Issue 4, Jul. 2006, pp. 1487-1505.

Stroman et al., "Magnetic Resonance Imaging in Patients with Low-Tension Glaucoma," Archives of Ophthalmology, Feb. 1995, vol. 113, No. 2, pp. 168-172.

Trip et al., "Optic Nerve Diffusion Tensor Imaging in Optic Neuritis," NeuroImage, Apr. 2006, vol. 30, Issue 2, pp. 498-505.

* cited by examiner

METHOD OF DIAGNOSING DEGREE OF NEUROPATHY OF A NERVE BY DIFFUSION TENSOR MAPPING

TECHNICAL FIELD

The invention is related to a method of diagnosing degree of neuropathy of a nerve by diffusion tensor mapping. The method can be applied in diagnostics of human or animal nerves, in particular—of a human optic nerve and establishing the degree of neuropathy.

BACKGROUND

As it is known, in biological tissues, water translational diffusion is influenced by microstructural components, including cell membranes and organelles.

Certain of nerves, such as the optic nerve, are formed as an almost pure white matter tracts that have an intrinsically high water restricted diffusion due to their highly packed axons and the encompassing nerve sheaths. The movement of water molecules can be measured by magnetic resonance imaging (MRI).

One of the most powerful MRI technique proposed in 1994 (Basser, P. J.; Mattiello, J.; Lebihan, D. Estimation of the Effective Self-Diffusion Tensor from the NMR Spin Echo. *Journal of Magnetic Resonance*, Series B 1994, 103, 247-254) allows the measurement of directional diffusion and is called diffusion tensor imaging (DTI). This method comprises a group of techniques in which the eigenvalues and eigenvectors of the diffusion tensor are used to create images reflecting various diffusion properties of a tissue. DTI can provide information on anatomical connectivity in the brain by measuring the anisotropic diffusion of water in white matter tracts or in gray matter structures. One of the most commonly used measures is fractional anisotropy (FA), which quantifies how strong directional diffusion in the local voxel is. Many imaging studies are starting to use FA images from multiple subjects in voxelwise tract-based spatial statistical analyses, in order to localize brain changes related to development, training, degeneration or disease, and to explore anatomical connectivity in the brain and compare with other nonhuman primates (e.g. Smith, S. M.; Jenkinson, M.; Johansen-Berg, H.; Rueckert, D.; Nichols, T. E.; Mackay, C. E.; Watkins, K. E.; Ciccarelli, O.; Cader, M. Z.; Matthews, P. M.; et al. Tract-Based Spatial Statistics: Voxelwise Analysis of Multi-Subject Diffusion Data. *NeuroImage* 2006, 31, 1487-1505). In this method, called tractography, "seed voxels" are selected in a certain area of the brain, and then fiber trajectories are computed by an automated software.

Tractography is a method for identifying white matter pathways in the living human brain and it is the tool for non-invasive and in vivo identification and measurement of these pathways. Fiber trajectories form the substrate for information transfer between remote brain regions and are therefore central to understanding of function in both the normal and diseased brain. The idea of fiber tracking is to follow the primary eigenvector from the selected seed voxel (or group of voxels) to encounter neighboring voxels, at which the trajectory is changed according to the direction of the new eigenvector in the neighboring voxel. Fiber tracking ends when one of the following conditions is met: 1) the tract reaches the boundary of the imaging volume; 2) the tract reaches a region with low diffusion anisotropy; 3) the radius of curvature of the tract is smaller than a selected threshold radius; or 4) the most collinear eigenvector is not associated with the largest eigenvalue (Basser, P. J.; Pajevic, S.; Pierpaoli, C.; Duda, J.; Aldroubi, A. In Vivo Fiber Tractography Using DT-MRI Data. *Magnetic Resonance in Medicine* 2000, 44, 625-632). The resulting trajectories can be used as a region of interest (ROI) for FA and other scalar parameters voxel-based measurements.

In principle, the DTI technique should be helpful in visualizing the optic nerve and tract. Unfortunately, because of the insufficient spatial resolution of the images, some of the nerves, such as, for example, the optic nerve or spinal cord, are technically difficult to investigate with any MRI technique, especially DTI. Some progress is being reported (see He, J.; Zhang, F.; Xie, G.; Yao, S.; Feng, Y.; Bastos, D. C. A.; Rathi, Y.; Makris, N.; Kikinis, R.; Golby, A. J.; et al. Comparison of Multiple Tractography Methods for Reconstruction of the Retinogeniculate Visual Pathway Using Diffusion MRI. *Human Brain Mapping* 2021) and several studies have shown successful tracking of some parts of the optic pathway (see for example Hofer, S.; Karaus, A.; Frahm, J. Reconstruction and Dissection of the Entire Human Visual Pathway Using Diffusion Tensor MRI. *Frontiers in neuroanatomy* 2010, 4, 1-7). Further, visualization of retinogeniculate visual pathway fiber displacement due to tumors has been reported—see for example publication The Role of Diffusion Tensor Imaging in Brain Tumor Surgery: A Review of the Literature (Potgieser, A. R. E.; Wagemakers, M.; van Hulzen, A. L. J.; de Jong, B. M.; Hoving, E. W.; Groen, R. J. M. The Role of Diffusion Tensor Imaging in Brain Tumor Surgery: A Review of the Literature. *Clinical neurology and neurosurgery* 2014).

Nevertheless, it is challenging for current tractography methods to accurately track optic pathway fibers that correspond to known anatomy and reproduce reasonably decussating fibers. This is because the optic nerve is surrounded by cerebrospinal fluid and fat, which significantly affect the measured signal. It is also not known what the effect of the presence of nearby bony structures, veins, or even muscles and tendons is. An abnormal signal near the optic canal, where the optic nerve is surrounded by bone and air, results in negative diffusion tensor eigenvalues (He, J.; Zhang, F.; Xie, G.; Yao, S.; Feng, Y.; Bastos, D. C. A.; Rathi, Y.; Makris, N.; Kikinis, R.; Golby, A. J.; et al. Comparison of Multiple Tractography Methods for Reconstruction of the Retinogeniculate Visual Pathway Using Diffusion MRI. *Human Brain Mapping* 2021, 42, 3887-3904). Further, the small size of the optic nerve and its movement during scanning make it even harder to obtain high-quality images. Additionally, sequences such as planar imaging (EPI) used in DTI are more sensitive to image artifacts and eddy current distortions than any other MRI technique. Limitations of the EPI include low spatial resolution, blurring effects of T2 decay occurring during image readout, and sensitivity to artifacts due to Nyquist ghosting, chemical shift, magnetic field inhomogeneity, and local susceptibility effects (Mukherjee, P.; Chung, S. W.; Berman, J. I.; Hess, C. P.; Henry, R. G. Diffusion Tensor MR Imaging and Fiber Tractography: Technical Considerations. *PHYSICS REVIEW AJNR Am J Neuroradiol* 2008, 29, 843-852; Mukherjee, P.; Berman, J. I.; Chung, S. W.; Hess, C. P.; Henry, R. G. Diffusion Tensor MR Imaging and Fiber Tractography: Theoretic Underpinnings). To obtain a high-resolution tractography of the optic pathway—in animals—it is necessary that the acquisition time is several dozen hours or even few days (as reported in Liu, C.; Ye, F. Q.; Newman, J. D.; Szczupak, D.; Tian, X.; Yen, C. C. C.; Majka, P.; Glen, D.; Rosa, M. G. P.; Leopold, D. A.; et al. A Resource for the Detailed 3D Mapping of White Matter Pathways in the Marmoset Brain. *Nature Neuroscience* 2020 23:2 2020).

Although the person skilled in the art would surely have the detailed knowledge regarding diffusion tensor imaging (DTI) measurements, its most important aspects will be explained in more detail below.

The goal of DTI is to image the diffusion of water in the brain, using the fact that water is always moving due to Brownian motion, what leads to constant natural diffusion of water in different directions. A strong magnetic field and different gradient fields are applied to the brain, and these gradient fields allow to label water movement differentially. Water molecules that moved during magnetization have a different magnetization than their neighbouring water molecules, which results in an image contrast change. Doing this in more than six directions (for a 3D visualisation) allows to calculate the direction of water diffusion, usually marked by different colours on the image. Besides the direction of water diffusion, it is also possible to measure its amount. Combination of the direction and amount of diffusion allows to compute a tensor. The value of such tensor in each point in the brain can be quantified. There are a number of ways the shape of the tensors in each volume pixel (voxel) can be quantified. There are 4 most commonly used measures: fractional anisotropy (FA), mean diffusivity (MD), axial diffusivity (AD) and radial diffusivity (RD). These measures relate to the value of the three main eigenvalues of the tensor (usually marked as $\lambda_1$, $\lambda_2$, $\lambda_3$), the eigenvalue being the value of diffusion for each eigenvector.

Water inside white matter tracks preferentially diffuse along the same direction as the white matter fibers (therefore the diffusion is anisotropic), while in gray matter, since the microstructure is poorly organized and dense, water can not easily diffuse directionally—thus, it diffuses much more isotropically. Each measured voxel is characterised by six diffusion tensor components. There are two extreme examples of diffusion tensors: the tensor having roughly equal eigenvalues for each main vector (isotropic diffusion profile) and the tensor having one eigenvalue highly different than another (anisotropic diffusion profile; diffusion substantially in one direction).

Fractional anisotropy (FA) provides the relative difference between the largest eigenvalue $\lambda_1$ and the others; it quantifies the presence of dominant eigenvalue. It shows high values in organized and dense structures (white matter pathways).

Mean diffusivity (MD) provides an average of all three main eigenvalues of the tensor (MD=$(\lambda_1+\lambda_2+\lambda_3)/3$). MD measure is specifically sensitive to cerebral spinal fluid (CSF) having high values of average diffusion—voxels with much CSF show high MD.

Axial diffusivity (AD) quantifies only the value of $\lambda_1$, thus it represents diffusion in the largest eigenvalue. It is specifically sensitive to highly organized structures, such as white matter pathways. Large open ventricles also show high $\lambda_1$ values since they have generally high levels of diffusion. AD noticeably decreases in axonal injuries.

Radial diffusivity (RD) is an average of two least eigenvalues of the tensor (RD=$(\lambda_2+\lambda_3)/2$). It shows high values in regions with CSF, intermediate values in gray matter and low values in highly organized, dense structures (e.g. white matter pathways). Changes in the axonal diameters, density or demyelination results in RD changes.

In the standard DTI visualization, the principal component of the diffusion tensor at each voxel is displayed with line segments. It is also possible to display multiple line segments per voxel that show the second and the third eigenvectors. For color coding of displayed line segments, standard RGB convention is used where the colors red, green and blue represent diffusion along the x-, y- and z-axes, respectively. Three eigenvectors can also be visualized in the form of an ellipsoid with symmetry axes parallel to the eigenvectors and the color depending on the dominating eigenvalue.

Several studies have found strong correlations between the severity of disease, specifically the severity of glaucoma, and a reduction in FA, as well as an increase in MD in the optic nerve. Patients with optic neuritis have been found to have increased MD, and decreased FA (Trip, S. A.; Wheeler-Kingshott, C.; Jones, S. J.; Li, W. Y.; Barker, G. J.; Thompson, A. J.; Plant, G. T.; Miller, D. H. Optic Nerve Diffusion Tensor Imaging in Optic Neuritis. *NeuroImage* 2006, 30, 498-505). Similar findings have been reported in patients with multiple sclerosis (RS, S.; M, K.; DL, T.; MR, S.; P, C.; DH, M.; CA, W.-K. Development of a High-Resolution Fat and CSF-Suppressed Optic Nerve DTI Protocol at 3T: Application in Multiple Sclerosis. *Functional neurology* 2013, 28).

However, because of the low resolution of the diffusion images, the results are often inconclusive, and correlations are not sufficiently strong. Because of this, is it difficult to assess the exact degree of the optic nerve functionality such as in visual evoked potentials measurements (Odom, J. V.; Bach, M.; Brigell, M.; Holder, G. E.; McCulloch, D. L.; Mizota, A.; Tormene, A. P. ISCEV Standard for Clinical Visual Evoked Potentials: (2016 Update). *Documenta Ophthalmologica* 2016 133:1 2016, 133, 1-9). In some cases, for example in optic neuritis (Rizzo, J. F.; Andreoli, C. M.; Rabinov, J. D. Use of Magnetic Resonance Imaging to Differentiate Optic Neuritis and Nonarteritic Anterior Ischemic Optic Neuropathy. *Ophthalmology* 2002, 109, 1679-1684) or glaucoma (Stroman, G. A.; Stewart, W. C.; Golnik, K. C.; Curé, J. K.; Olinger, R. E. Magnetic Resonance Imaging in Patients With Low-Tension Glaucoma. *Archives of Ophthalmology* 1995, 113, 168-172), the optic nerve can be assessed from morphological images based on T1 or T2.

Taking into account patent literature, several important solutions, from the point of view of the present application, have been made.

For example, American patent document U.S. Pat. No. 7,480,400B2 discloses a computer-implemented method for detection of fiber pathways based on DTI images. The method includes determining initial data as a subset of voxels that have been selected from a diffusion tensor image by applying a threshold to fractional anisotropy values, determining a cluster of points with highly collinear diffusion directions, and performing region growth to find suitable seed points in a plane that is normal to the cluster's mean direction, starting from the center of the cluster. The method further includes tracing pathways from the seed points, eliminating voxels of the subset from the initial data that are close to any of the pathways using a distance threshold, displaying a visualization of a selection of voxels used as seed points and of the pathways traced from the seed points.

Another American patent document U.S. Ser. No. 11/375,918B2 discloses a method of characterizing the brain of a subject, comprising: (a) performing a multispectral multi-slice magnetic resonance scan on the brain of a subject, (b) storing image data indicative of a plurality of magnetic resonance weightings of each of a plurality of slices of the brain of the subject to provide directly acquired images, (c) processing the directly acquired images to generate a plurality of quantitative maps of the brain indicative of a plurality of qMRI parameters of the subject, (d) constructing a plurality of magnetic resonance images indicative of white matter structure from the quantitative maps, and (e) generating a spatial entropy map of the brain of the subject from the plurality of magnetic resonance images; and/or generating a myelin water map of the brain of the subject from the plurality of magnetic resonance images. Document U.S. Ser. No. 10/575,753B2 discloses a similar method of making a white matter fibrogram representing the connectome of the brain of a subject, whereby it differs from U.S. Ser. No. 11/375,918B2 in the step (e), which in turn comprises here rendering a white matter fibrogram of the brain of the subject from the plurality of magnetic resonance images.

Japanese patent application JP2004081657A discloses a method for extracting nerve fiber images, an image processing device, and a magnetic resonance imaging system. In this method, a diffusion tensor matrix is calculated from information on diffusion tensor images and T2 weighted images. By diagonalyzing the matrix, eigenvalues and eigenvectors are obtained. A fractional anisotropy (FA) value is calculated from the eigenvalues, from which a region of the nerve fibers is extracted. The pixels of the nerve fibers in the direction of the maximum eigenvector showing the direction of the nerve fibers are extracted sequentially from the region of the nerve fibers by using a region extension means.

To sum up, standard MRI morphological images fail to show the functionality of the optic nerve. Current limitations and artifacts due to eddy currents and susceptibility effects on scan acquisition together with unavoidable patient movement put serious limits on the quality of diffusion weighted images. Owing to the technical limitations of the current scanners and long acquisition time requirements, it is impossible to obtain good-quality diffusion images of the optic pathway and hence probabilistic tractography results. Optic pathway shape and anatomy make this problem even more demanding. All the way to the back of the brain requires going through the lateral geniculate nucleus and turning off the fiber near Myer's loop. This procedure is very challenging because the curvature of the optic nerve is very high, and thus, the DTI-based method tracking loses the optic nerves at that point. Through the optic chiasm fibers cross in some cases and merge or branch, going in and out on the same side. None of the tractography methods are inherently able to properly deal with this complicated topology and with the intricate morphology of crossing and branching. Scalar diffusion parameters of the optic nerve are much more often measured by manual selection of the area of interest by qualified radiologists or from tracts found with tractography, manually trimmed by an experienced physician to better match the anatomy. Therefore, standard manual and semi-automatic segmentations, as well as tractography, do not always reproduce the well-known anatomy surrounding the optic nerve.

In general, visualization of the optic nerve is necessary because in many cases where patients report visual impairment, changes are seen on electroencephalography but not on MRI images. The electroencephalographic result itself is sometimes ambiguous and in order to make an accurate diagnosis, it is necessary to compare it with another method. Apart from clinical and electrophysiological evaluation, MRI plays an important role in the complete assessment of optic nerve and the entire visual pathway. MRI images are helpful in describing the segmental anatomy of the optic nerve and to findings of various conditions affecting the optic nerves. Because of the insufficient spatial resolution of the diffusion MRI images, it is difficult to assess the degree of the optic nerve neuropathy.

Taking into account the above considerations, it is desired to develop a data analysis algorithm and a procedure capable of accurately assessing the degree of the optic nerve atrophy based only on actual diffusion tensor data, without relying on probabilistic tools.

SUMMARY

The beneficial effect of the invention is that it allows to obtain a quantitative measure of optic neuropathy without the need for manual segmentation, which can be difficult due to the small size of the optic nerve. This is achieved by knowing the sigma ($\sigma$) value at which the optic nerve disappears from the image, whereby the measurement of the threshold value of the $\sigma$ parameter is absolute, which makes it possible to compare optic nerves obtained on different scanners and with different acquisition parameters. The present invention allows for a direct visualization of data for the optic nerve by diffusion tensor mapping, without relying on probabilistic imaging tools. Appropriate matching and combining scalar values of the diffusion tensor with the eigenvector data results in the generation of an image that shows a significant advantage in optic nerve neuropathy assessment. The atrophic and healthy nerves can be differentiated with the present algorithm without any segmentation and can be correlated with diffusion voxel-based metrics such as FA or MD. The present invention also allows for the visibility enhancement of the entire fibrous nerve structure. The proposed new approach of diffusion tensor visualization of the optic nerve and tract can be a complementary to the standard tractography methods, particularly in cases when the standard results that do not fit well with the known anatomy, and may be used for many nerves having substantially fibrous shape. Another beneficial effects are short data acquisition time and independence from the MRI machine.

The subject of the invention is a method of diagnosing degree of neuropathy of a nerve by diffusion tensor mapping, said method comprising the following steps:

a) acquiring diffusion tensor imaging, DTI, digital images of the nerve based on magnetic resonance, MR, data of the part of the body comprising said nerve, b) for each voxel in said DTI digital images calculating a diffusion tensor $\hat{D}$ $$\hat{D} = \begin{bmatrix} D_{xx} & D_{xy} & D_{xz} \\ D_{yx} & D_{yy} & D_{yz} \\ D_{zx} & D_{zy} & D_{zz} \end{bmatrix}.$$

and finding its eigenvalues $L_1 > L_2 > L_3$:

$$\hat{L} = \begin{bmatrix} L_1 & 0 & 0 \\ 0 & L_2 & 0 \\ 0 & 0 & L_3 \end{bmatrix}$$

c) selecting a region of interest in at least one of said DTI digital images, said region of interest comprising pixels, d) calculating the threshold value $\sigma_{th}$ of a cutoff parameter $\sigma$, ranging from 0 to $L_1$, as the minimal value of $\sigma$ for which the following cutoff condition $$L_1 \geq RD + \sigma$$

is false for all pixels within the region of interest, wherein RD is a radial diffusivity defined as $$RD = (L_2 + L_3)/2.$$

Preferably, said nerve is a human or an animal nerve.

Preferably, said nerve is an optic, an auditory nerve, an oculomotor nerve, a trigeminal nerve, a vestibulocochlear nerve, white matter of a brain or a spinal cord.

Preferably, the acquisition of said images in step a) is conducted for no more than 15 minutes.

Preferably, said nerve is an optic nerve and which comprises the following additional steps, performed after step b) and before step c):

b1) for each voxel in said DTI digital images calculating fractional anisotropy FA, mean diffusivity MD, and radial diffusivity RD, wherein:

$$FA = \frac{(L_1 - L_2)^2 + (L_2 - L_3)^2 + (L_1 - L_3)^2}{2(L_1^1 + L_2^2 + L_3^2)},$$

$$MD = (L_1 + L_2 + L_3)/3,$$

$$RD = (L_2 + L_3)/2.$$

b2) associating—with the first eigenvector in each voxel—a line segment representing the main direction of the diffusion in this voxel, said line segment having a length, an opacity and an RGB color assignment, b3) for each line segment—adjusting its length to a value given by:

$$\alpha(L_1 - RD)^\eta,$$

wherein $\alpha$ is a scaling parameter ranging from 1 to 1000 and $\eta$ is a scaling parameter ranging from 1 to 3, b4) for each line segment—adjusting its opacity to a value given by:

$$\beta \cdot MD \cdot FA,$$

wherein $\beta$ is a scaling parameter ranging from 1 to 1000, b5) for each line segment—adjusting its RGB color assignment as follows:

$$\text{Red} = \gamma L_1,$$

$$\text{Green} = 1 - L_1,$$

$$\text{Blue} = 0$$

wherein $\gamma$ is a scaling parameter for setting the intensity of red color ranging from 0 to 3, thereby obtaining an adjusted three-dimensional shape of the nerve b6) projecting said adjusted three-dimensional shape of the nerve onto a transverse plane by superposing two or more layers of the adjusted three-dimensional shape on said transverse plane, thereby obtaining a planar superposed image, to be further used as an DTI digital image for steps c) and d).

Preferably, $\alpha$ is 200.

Preferably, $\eta$ is 2.2.

Preferably, $\beta$ is 500.

Preferably, $\gamma$ is 2.

Preferably, the layers mentioned in step b6) are selected such that they are essentially parallel to the axis of the optical nerve.

Preferably, neuropathy of the optical nerve is diagnosed for $\sigma^{th}$ lower than 0.27.

Preferably, the digital images acquired in step a) are echo planar imaging diffusion tensor imaging, EPI DTI, digital images.

Preferably, said method of diagnosing degree of neuropathy of a nerve by diffusion tensor mapping is computer-implemented.

BRIEF DESCRIPTION OF THE DRAWINGS

Preferred embodiments of the present invention are presented in a more detailed way with reference to the attached drawing, in which:

FIGS. 1a-c are presented in radiological orientation convention.

FIG. 4 presents also density plots showing all voxels in the datasets used for visualization (black dots) and voxels omitted according to condition (9) (grey dots).

DETAILED DESCRIPTION

Figure 1:
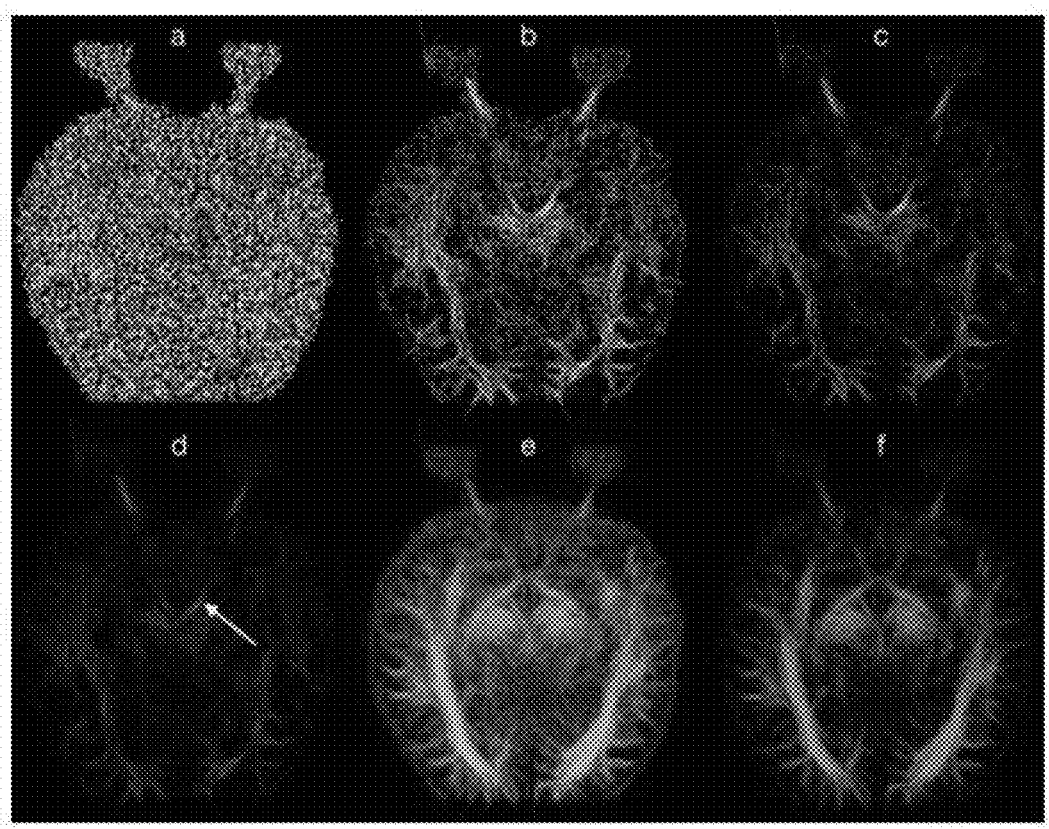
FIG. 1a-f presents the visual effect of the algorithm in six steps for a healthy subject, wherein the subsequent steps are: a—principal diffusion directions shown as line segments; b—length coding; c—opacity coding; d—color coding; e—seven layers projection; f—seven layers projection and data thresholding.

Preferred embodiments of the invention are described in details below. The examples serve only as an illustration and do not limit the scope of the present invention.

BRIEF DESCRIPTION OF THE STUDY

To develop a method according to the invention, it was important to perform a case study, which is described below. The used set-up, including all parameters of the scan, as well as software and hardware used, are exemplary and should not be treated as limiting the scope of the present invention.

Images from a healthy male subject (age: 32) and a male subject with penetrating right eyeball injury (age: 46) were used. Both subjects underwent a full ophthalmological examination, which included visual acuity, color vision, applanation measurement of intraocular pressure, evaluation of the anterior chamber and the fundus of the eye using a slit lamp and the Volk lens, optical coherence tomography examination of the macula and optic nerve disc (OCT), neurological field vision, and visual evoked potential (VEP) testing. In the tests conducted, no deviations from the normal condition were found in the subjects, while the trauma patient had endotamponade of the vitreous chamber of the right eye with silicone oil, lack of sense of light, secondary glaucoma, and atrophy of the right eye optic nerve, and correct ophthalmological examination of the left eye. In his medical history, the patient reported that prior to the penetrating injury (metal shard from a masonry hammer driven into the eyeball), the patient did not experience any deterioration in vision compared to the left eye. During active scanning, the patients tried not to blink and did not move their heads, while gazing at the red-locking LED outside the camera reflected in the mirror of the coil. Imaging acquisition required about 10 minutes of gaze fixation.

In diffusion tensor imaging, the subject uncontrolled blinking, eyeball movements, and spatial and temporal variations of the static magnetic field caused by susceptibility effects and time-varying eddy currents result in severe distortions, blurring, and misregistration artifacts. Due to the limitations of acquisition time and attempts to shorten it to a minimum for the patient's comfort, only the part of the head containing the optic nerve and the tract was scanned.

MRI data were acquired using a Biograph mMR 3-Tesla scanner (Siemens, Erlangen, Germany) with a 16-channel head-neck coil. Acquisition parameters were set up based on the article (Gerlach, D. A.; Marshall-Goebel, K.; Hasan, K. M.; Kramer, L. A.; Alperin, N.; Rittweger, J. MRI-Derived Diffusion Parameters in the Human Optic Nerve and Its Surrounding Sheath during Head-down Tilt. *npj Microgravity* 2017) and technician experience. The total duration of the EPI DTI examination was 10:34 min (8:05 and 2:29 for A>>P and P>>A phase encoding directions respectively). MRI acquisitions were obtained using a scanner with a maximum gradient amplitude of 45 mT/m and a maximum slew rate of 200 T/m/s. Parameters for used for echo planar (EPI) acquisition method were: TR 7000 ms, TE 113 ms, echo spacing 0.97 ms, bandwidth 1184 Hz/Px, EPI factor 128, voxel size 1.3×1.3×2.0 mm, 25 slices (transverse orientation), distance factor 0% for transverse plane and 50% for other planes, base resolution 128 and prescan normalization filtering. Sixty-four non-collinear diffusion directions for a b value of 1000 s/mm2 with one average were acquired for the A>>P encoding direction and six averages without diffusion-weighted acquisition for b value of 0 s/mm2 were acquired for both the A>>P and the P>>A encoding directions. Parallel imaging with an acceleration factor of 2 was enabled using the GRAPPA algorithm. Additionally, an anatomical T1-weighted (MP RAGE) scan time 5:21 min, voxel size 1.0×1.0×1.2 mm, was performed.

In addition to coronal magnetization-prepared rapid acquisition gradient-echo reconstruction, oblique transverse sections through both optic nerves were done. The exact positions and angulation of slices were further graphically specified and adjusted in the central sections of the left and right sagittal optic nerves. This procedure allowed for an exact adjustment of the EPI and T1 slices through both optic nerves. In general, positioning was focused on the part of the optic nerve closest to the eye to allow for optimal comparability in the case of a curved optic nerve.

The orientation of layers was chosen such that they were parallel to the optic nerve axis to a large extent, which is different than standard brain scanning, and which is an important aspect of the present invention since it may affect the results significantly.

Diffusion images were converted from the DICOM format to the NIfTI format using the open source dom2niix software, and the data were post-processed using the FSL software library (Jenkinson M.; Beckmann C. F.; Behrens T. E.; Woolrich M. W.; Smith S. M. FSL; 2011). The ITK-SNAP software was used to create a binary mask of the brain, eyeballs, and optic nerves. FSL's tools were used for susceptibility-induced and eddy current-induced distortion correction, and movement artifacts correction (what is known in the art). The correction procedure assumes that the eddy current-induced field can be modelled as a combination of linear and quadratic terms. Calculations were parallelized with CUDA v9.1 on Nvidia Tesla K80 GPU. Eddy current and motion-corrected diffusion-weighted images were used for voxel-by-voxel-based tensor calculations. Consequently, eigenvectors ($V_1$, $V_2$ and $V_3$) and eigenvalues ($L_1 \geq L_2 \geq L_3$) were obtained. Throughout the text, the largest eigenvalue $L_1$ will be called axial diffusivity. For all other calculations, the Wolfram Mathematica software was used and NIfTI images were imported using the QMRITools toolbox developed for the Wolfram language (Froeling M. QMRTools: A Mathematica Toolbox for Quantitative MRI Analysis. J Open Source Softw 2019, 4, 1204). Fractional anisotropy (FA), mean diffusivity (MD) and radial diffusivity (RD) were defined as in: Minati L.; Weglarz W. P. Physical Foundations, Models, and Methods of Diffusion Magnetic Resonance Imaging of the Brain: A Review. *Concepts Magn Reson Part A* 2007, 30, 278-307; Mukherjee P.; Chung S. W.; Berman J. I.; Hess C. P.; Henry R. G. Diffusion Tensor MR Imaging and Fiber Tractography: Technical Considerations. *PHYSICS REVIEW AJNR Am J Neuroradiol* 2008, 29, 843-852; Gerlach D. A.; Marshall-Goebel K.; Hasan K. M.; Kramer L. A.; Alperin N.; Rittweger J. MRI-Derived Diffusion Parameters in the Human Optic Nerve and Its Surrounding Sheath during Head-down Tilt. *NPJ Microgravity* 2017, 3, 18, i.e.:

$$FA = \frac{(L_1 - L_2)^2 + (L_2 - L_3)^2 + (L_1 - L_3)^2}{2(L_1^2 + L_2^2 + L_3^3)} \quad (1)$$

$$MD = \frac{(L_1 + L_2 + L_3)}{3} \quad (2)$$

$$RD = \frac{(L_2 + L_3)}{2} \quad (3)$$

Algorithm

The physical property of the diffusion tensor is that all eigenvalues are non-negative. However, correction algorithms and low-resolution data can lead to negative eigenvalues that are clearly non-physical and are usually the results of numerical algorithms imperfection. Therefore, in the present procedure all negative, nonphysical eigenvalues are set to zero before normalization. Replacing them with zero is preferred over replacing them with a modulus, which also is possible, however much less justified numerically.

The first step of a method of diagnosing degree of neuropathy of a nerve by diffusion tensor mapping is acquiring data to estimate diffusion tensor imaging (DTI) metrics, especially with echo planar imaging sequences (EPI DTI). The data are digital images of the nerve based on magnetic resonance, MR—of the part of the body comprising said nerve. Digital images acquired in this step are especially obtained by echo planar imaging diffusion tensor imaging (e.g. SE EPI, GRE EPI), but using other sequences is also possible. Preferably, while using EPI, the acquisition of said images is conducted for no more than 15 minutes.

Further, for each voxel in said DTI digital images a diffusion tensor D is calculated:

$$\hat{D} = \begin{bmatrix} D_{xx} & D_{xy} & D_{xz} \\ D_{yx} & D_{yy} & D_{yz} \\ D_{zx} & D_{zy} & D_{zz} \end{bmatrix}. \quad (4)$$

Along each of the x, y and z principal directions of diffusion, the diffusion coefficient is $L_1$, $L_2$, $L_3$, respectively. The unit vectors $(1,0,0)^T$, $(0,1,0)^T$ and $(0,0,1)^T$, directed along x, y, and z, are called eigenvectors and are referred to as $e_1$, $e_2$, $e_3$. Each eigenvector corresponds to one eigenvalue. Eigenvectors and eigenvalues are related by the fact that when a tensor is multiplied by an eigenvector, the result is the same eigenvector multiplied by the eigenvalue:

$$\hat{D}e_i = L_1 e_i \quad i = \{1, 2, 3\}, \quad (5)$$

Further, eigenvalues $L_1 > L_2 > L_3$ of the a diffusion tensor $\hat{D}$ are found.

For every subject eigenvalues are normalized by dividing by maximum value of the $L_1$ among all voxels. An alternative method is dividing by median value of the $L_1$. Changing the normalization method would result in the necessity of re-calculating $\sigma$ values ($\sigma$ is referred to below).

For each voxel in said DTI digital images, fractional anisotropy FA, mean diffusivity MD, and radial diffusivity RD are calculated, according to equations (1), (2) and (3) above.

The data visualization algorithm itself will be described below, and consists of six steps each having a significant impact on the displayed image. The visual effect accomplished by each step is presented in FIG. 1a-f.

The first step (FIG. 1a) is associating—with the first eigenvector—a line segment representing the main direction of the diffusion in this voxel, said line segment having a length, an opacity and an RGB color assignment. The first eigenvector in each voxel is represented as a line segment representing the main direction of diffusion in that voxel, and the line segments are given some initial length, which may be the same length. Because the morphological structure of the optic nerve favors the presence of one particularly distinguished direction of diffusion, especially voxels in which diffusion is strongly directional i.e., $L_1 >> L_2$ should be taken into account. A picture resulting from the first step does not have to be actually displayed.

Hence, in the second step (FIG. 1b), the length of the line segment in each voxel is adjusted to a value given by $$\alpha(L_1 - RD)^\eta \quad (6)$$

where $\alpha$ is a scaling parameter. This means that the more $L_1$ deviates from RD, the longer is the line segment for that voxel. The scaling parameter $\alpha$ ranges from 1 to 1000. In the present embodiment, parameter $\alpha$ is set to 200. $\eta$ is also a scaling parameter, ranging from 1 to 3. For example, scaling parameter $\eta$, in this embodiment, is equal to 2.2.

Another important piece of information is the strength of diffusion in each voxel. Thus, in the third step (FIG. 1c), the opacity of the line segment in each voxel is adjusted, i.e. is set proportional to the product of the mean diffusivity and fractional anisotropy, to a value given by $$\beta * MD * FA \quad (7)$$

where $\beta$ is a scaling parameter, ranging from 1 to 1000. This means that the stronger the diffusion, the opaquer the segment for that voxel. In the present embodiment, parameter $\beta$ is set to 500.

The fourth step in the algorithm (FIG. 1d) is an RGB color assignment that improves image clarity based on $L_1$ values as follows $$\text{Red} = \gamma L_1 \quad (8)$$
$$\text{Green} = 1 - L_1$$
$$\text{Blue} = 0$$

where $\gamma$ is a scaling parameter for setting the intensity of red color, $\gamma$ ranging from 0 to 3. In the present embodiment, parameter $\gamma$ is set to 2. The white arrow in FIG. 1d shows oculomotor nerve. The goal of choosing a different color scaling than in the standard tractography is to assume that the $L_1$ values should be similar along the entire length of the optic pathway, and therefore, it should be presented in a similar color. Furthermore, standard tractography color coding appears to be ineffective for the optic pathway because this structure does not form a straight-line segment in three-dimensional projections and such coding would unnecessarily introduce different colors on different sections of the optic nerve and tract. For this reason, for optic pathway visualization, more than one layer must be used.

Figure 2:
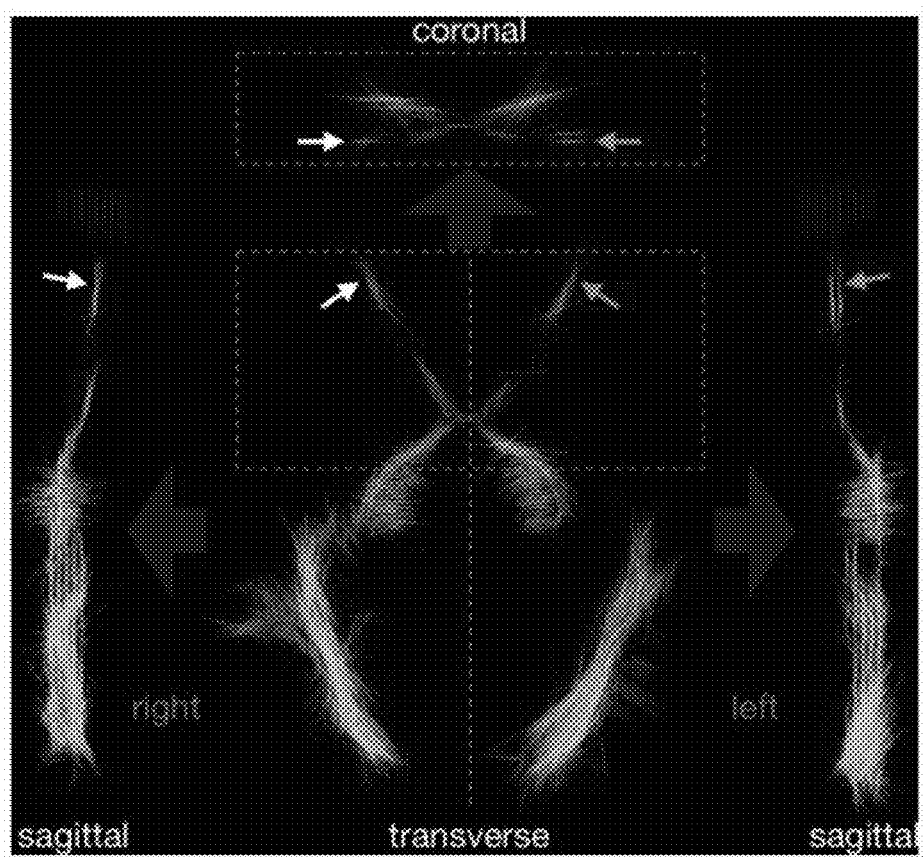
FIG. 2 shows visual pathway shape on different plane projections, wherein white and blue arrows indicate right and left optic nerve, respectively, and wherein real voxel proportions are preserved.

In step five (FIG. 1e), the three-dimensional shape of the visual pathways is projected onto the transverse plane, by superposing two or more layers of the adjusted three-dimensional shape on said transverse plane. In the present embodiment, seven layers were superimposed. The layers are preferably selected such that they are essentially parallel to the axis of the optical nerve. Thereby, a planar superimposed image is obtained, to be further used as an DTI digital image for the next steps. As a consequence, although the information about shape in the direction of the projection is lost, a much-improved visibility in the two other directions is gained (i.e., the plane perpendicular to the projection direction). On the transverse plane, the visual pathway is best visualized, but to show the complete location of the nerve, the segmented optic pathway is projected manually onto the sagittal and coronal planes (FIG. 2). In other words, after the projection of a few layers onto one plane, a superposition of line segments in each voxel is obtained, producing enhanced visibility.

Then, a region of interest (ROI) in at least one of said DTI digital images is selected, said region of interest comprising pixels.

Figure 4:
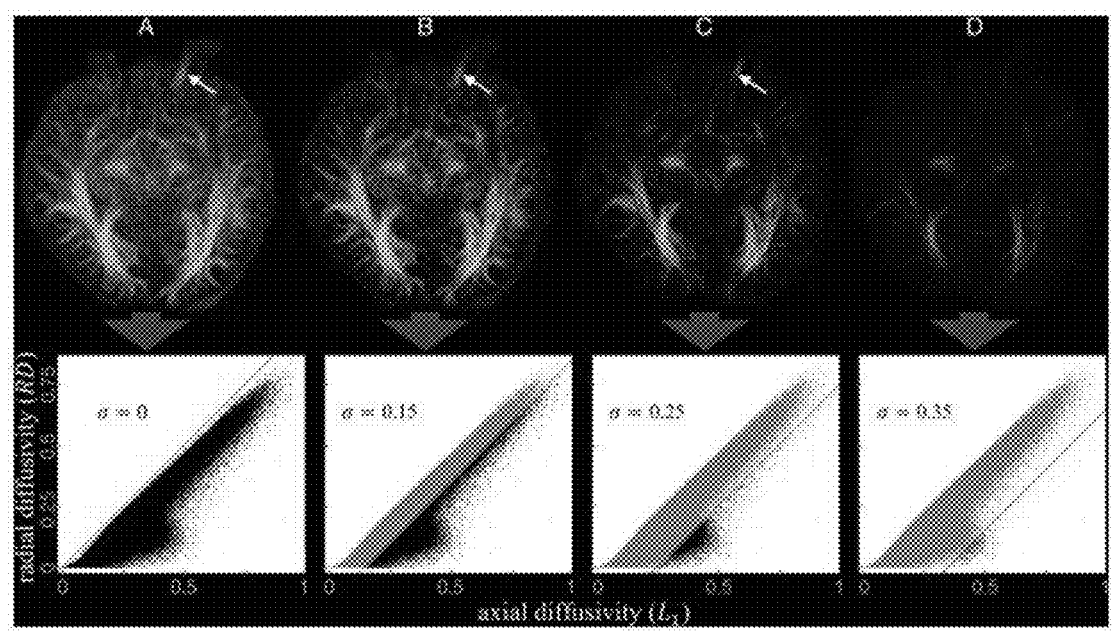
FIG. 4 presents images for male subject with right optic nerve neuropathy, in radiological orientation convention, generated for $\sigma$ values equal to A) 0, B) 0.15, C) 0.25, and D) 0.35.

Segment superposition can affect image clarity and for this reason a sixth step is implemented (FIG. 1f), in which short line segments are discarded based on the following cutoff condition $$L_1 > RD + \sigma, \qquad (9)$$

where σ is a threshold value (FIG. 4). In other words, the threshold value $\sigma_{th}$ of a cutoff parameter σ is calculated, ranging from 0 to $L_1$, as the minimal value of σ for which the cutoff condition given by equation (9) is false for all pixels within the region of interest, wherein RD is radial diffusivity defined as in equation (3). Filtering of data used for imaging by applying a threshold value (abbreviated by $\sigma_{th}$) found by analysis of diffusion tensor components of the image, and abandonment data in all pixels for which radial component of diffusivity (abbreviated by RD) increased by the threshold value ($\sigma_{th}$) exceeds the first main component (abbreviated by $L_1$).

For the sake of clarity: the threshold value of the σ estimated by equation (9) is the maximal value of the σ for which condition (9) is true for all pixels within the region of interest (as well as the minimal value of σ for which the cutoff condition given by equation (9) is false for all pixels within the region of interest). In another words, the threshold value of the σ is equal to the largest difference between axial and radial diffusivity for the pixels inside the region of interest. A boundary of the region of interest includes an optic nerve ranging from eyeball to the optic canal.

The result is that line segments are displayed only if the axial diffusivity exceeds the radial diffusivity by more than a chosen value for σ. This will be described in more detail further in the text.

Thus, the σ parameter can be used as a quantitative measure in the diagnosis of nerve neuropathy (atrophy). Preferably, and in the present embodiment, neuropathy of the nerve, here optical nerve, is diagnosed for $\sigma_{th}$ lower than 0.27.

The presented algorithm and projections in three directions are particularly suited for the imaging of fiber structures. The optic nerves are clearly visualized in FIG. 2 (arrows). The right-hand side nerve is visualized as a single fiber, while the left-hand side nerve is split on coronal and sagittal projections because it is located just between the two planes used in the imaging protocol. Parameters α, β, γ and σ were selected once to ensure the best visibility of the visual pathways. These parameters may require modifications for other nerves.

Diffusion tensor estimation can produce indefinite diffusion tensors that arise in locations where the diffusion-weighted signal is disturbed by noise and the degree of anisotropy is high. In biological tissue, all eigenvalues of the diffusion tensor are assumed to be positive but due to noise or signal drop, negative eigenvalues may be generated. The fraction of voxels for which negative eigenvalues have been generated relative to the total number of all voxels, expressed as a percentage, can be used as a measure of image quality. For a healthy subject, those values were 0.61%, 6.5% and 9.0% for $L_1$, $L_2$ and $L_3$ maps, respectively. In the case of a subject with a damaged eyeball, these values reached the values of 0.99%, 2.3%, and 9.5%, respectively.

Datasets from nine healthy subjects (the "Young Adult Diffusion Dataset" release of healthy adults between the ages of 20 and 59) from the HCP database (https://www.humanconnectome.org) were used for experimental evaluation. The HCP data scanning protocol was approved by the local Institutional Review Board (IRB) at Washington University. The HCP database provides diffusion data that was acquired with a high-quality image acquisition protocol using a customized Connectome Siemens Skyra scanner and processed using a well-designed processing pipeline including motion correction, eddy current correction and distortion correction. The diffusion acquisition parameters in HCP were: TR=5.520 ms, TE=89.5 ms, FA=78°, voxel size=1.25×1.25×1.25 mm, and FOV=210×180 mm. A total of 288 images were acquired in each diffusion dataset, including 18 baseline images with a low diffusion weighting b=5 s/mm² and 270 diffusion weighted images evenly distributed at three shells of b=1,000/2,000/3,000 s/mm². In this study only single-shell b=1,000 s/mm² data, consisting of 90 diffusion weighted images and 18 baseline images, were used for calculating with the present algorithm. Single-shell b=1,000 s/mm² data were used because it is similar to our clinical acquisition protocol. Furthermore, single-shell b=1,000 s/mm² data has been shown to be more effective for identification of cranial nerves than higher b values. A visual check of the diffusion data for each of the subject was performed and any subjects whose diffusion data had incomplete optic nerve coverage were excluded. An FSL Nudge Tool was used to manually adjust the affine for every image to cover the layers along the optic nerve and then the diffusion tensor was calculated. Finally, nine subjects were chosen, and thresholds of σ value were calculated. These nine subjects from HCP database were not underwent a full ophthalmological examination, and if there are any visual diseases, this may be the reason of the σ values fluctuations. No visual fixation and eyeballs movement during the examination made it difficult to distinguish the optic nerve from the periocular muscles.

Figure 3:
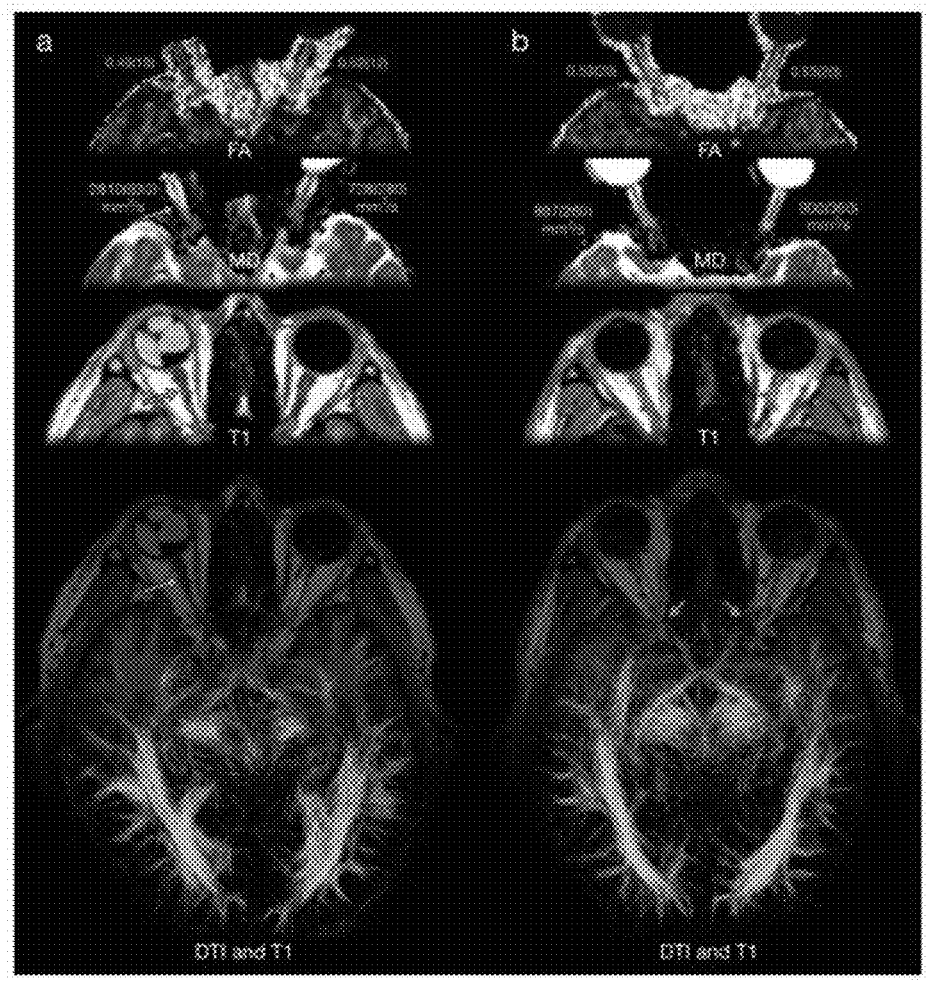
FIG. 3 presents visual pathways of a male subject with right optic nerve atrophy, shown by orange arrows (FIG. 3a) and of healthy male subject (FIG. 3b); visual pathways are visualized with the DTI algorithm superimposed on the same T1 image, whereby optic nerves are also presented on diffusion scalar maps FA and MD, and on morphological T1-weighted images, and whereby the orientation convention used is radiological.

The presented algorithm was used to generate images of the visual pathway in a healthy male subject (FIG. 3b) and a male subject with the right optic nerve atrophy caused by eyeball injury (FIG. 3a). Blue arrows in FIG. 3b show optic canal and locations of visible discontinuities. Values of the α, η, β, γ and σ used in visualization were 200, 2.0, 500, 2.0 and 0.2, respectively. Actual values of FA and MD measured in a ROI containing the optic nerve are presented in FIG. 3 in green. For progressive optic neuropathy in the second subject an increased MD and decreased FA in the optic nerve have been found, compared to the healthy optic nerve of the same subject, and compared to the healthy optic nerve of the first subject (Table 1). In T1 image a constriction of the atrophic nerve compared to the left optic nerve have been found (FIG. 3). The DTI image represented as line segments generated by the said algorithm showed significant difference between the atrophic and fully functional optic nerves with no segmentation required. The most important for unidirectional diffusion data were extracted by introduced threshold parameter $\sigma_{th}$. A set of images generated for different values of σ show that this parameter can be used as an indicator of the degree of neuropathy (FIG. 4). Both optic nerves from a healthy subject and left optic nerve from the subject with right eyeball injury are removed from the image when σ exceeds almost the same thresholding level (Table 1). In contrast, the atrophic nerve is not visible even for σ equal to zero (FIG. 4a). An example of the region of interest used for determining the $\sigma_{th}$ value is shown in green in FIG. 3.

TABLE 1

Fractional anisotropy (FA), mean diffusivity (MD) in the optic nerve and σ threshold value for which the last pixel inside the optic nerve is no longer displayed.

|  | subject with penetrating right eyeball injury | | healthy subject | |
| --- | --- | --- | --- | --- |
|  | right eye | left eye | right eye | left eye |
| FA | 0.40(19) | 0.52(12) | 0.53(20) | 0.53(20) |
| MD [mm²/s] | 2810(830) | 728(280) | 897(280) | 900(360) |
| $\sigma_{th}$ | 0 | 0.35 | 0.30 | 0.36 |

Threshold values of σ for which the last pixel inside the optic nerve is no longer displayed, calculated for 21 non-atrophic optic nerve (every nerve from 9 HCP subjects, two nerves from healthy subject, and one healthy nerve from subject with right eyeball injury) were similar (Table 2). The data presented in Table 2 show that standard deviation of the $\sigma_{th}$ parameter is over ten times smaller than the average value confirming reasonably good reproducibility. It was also checked that the particular choice of parameters α, η, β and γ (Equations (6), (7), (8) and FIG. 3) that resulted in improvement of nerve visualization does not affect the threshold value of σ at which the last pixel inside the optic nerve is no longer displayed (FIG. 4). FIG. 4 presents images for male subject with right optic nerve neuropathy generated for $\sigma_{th}$ values equal to A) 0, B) 0.15, C) 0.25, and D) 0.35. FIG. 4 presents also density plots showing all voxels in the datasets used for visualization (black dots) and voxels omitted according to condition (9) (grey dots). The dots are obtained from all voxels in the selected layers. The red dashed lines correspond to the condition given by equation $$L_1 = RD + \sigma. \quad (10)$$

The left optic nerve, shown by white arrow, is visible on FIG. 4A,B,C until a certain value of σ is exceeded (FIG. 4D).

It is important to note that the presented algorithm allows for visualization of the oculomotor nerve (indicated by the white arrow in FIG. 1d), consistent with the anatomical atlases. The bone canal through which the optic nerve passes (optic canal) may be the reason for the observed optic nerve discontinuities at this point (marked with blue arrows in FIG. 3).

TABLE 2

Distribution of $\sigma_{th}$ value for 21 non-atrophic optic nerves.

| parameter | value |
| --- | --- |
| median | 0.33 |
| mean | 0.33 |
| standard deviation | 0.03 |
| min | 0.27 |
| max | 0.39 |

By finding the σ threshold value for which the last pixel inside the optic nerve is no longer displayed, a quantitative measure of optic nerve neuropathy is obtained. Other numerical voxel-based measurements are possible by optic nerve segmentation from images in which voxel brightness intensities are set based on the product of segment length and opacity. In such a monochrome image, it is easy to draw a region of interest's mask, for example, on the part of the optic nerve starting behind the eyeball and ending on the skull optic canal, where the line continuity is lost. The σ parameter can also be helpful in drawing ROIs for measurements of diffusion tensor scalar values. In other words, founded masks can be automatically corrected by σ parameter, which may be a threshold value used for semi-automatic segmentation, or active contour segmentation. Both methods can be alternatives to different tractography segmentations and manual methods.

Knowing the sigma (σ) value at which the optic nerve disappears from the image allows to obtain a quantitative measure of optic neuropathy without the need for manual segmentation, which can be difficult due to the small size of the optic nerve.

Thus, as said above, the important conclusion is that the σ parameter can be used as a quantitative measure in the diagnosis of nerve neuropathy.

The selection of the α, β, γ and η parameters does not affect the value of the 0th parameter, for which the optic nerve disappears, because the result of the σ parameter is presented in the image in an objective way, and the change in the parameters α, β, γ and η affect only subjectively the visibility of the optic nerves. The measurement of the threshold value of the σ parameter, calculated using normalized eigenvalues, is absolute, which makes it possible to compare optic nerves obtained on different scanners and with different acquisition parameters.

It is also expected that the nerve in the image will always disappear at the same σ value, regardless of the α, β, γ and η parameters set, although these parameters must be set so that before increasing the σ value, the optic nerve is visible.

The present invention also shows that the projection of a few layers on a single plane is a preferential method to view fibrous tissues. Even though some 3D information is lost, the visibility enhancement of the entire structure is significant. Since multilayer projections cannot be merged with single layer morphological images due to possible mismatch, in FIG. 2 only a part of the T1 image in the background is shown.

The proposed new approach of diffusion tensor visualization of the optic nerve and tract can be a complementary to the standard tractography methods, particularly in cases when the standard results that do not fit well with the known anatomy.

The presented algorithm allows for a direct visualization of data for fibrous structures, such as the optic nerve, by diffusion tensor mapping, without relying on probabilistic imaging tools. Appropriate matching and combining scalar values of the diffusion tensor with the eigenvector data can result in the generation of an image that shows a significant advantage in nerve neuropathy assessment. As shown on the example of optic nerve, the atrophic and healthy nerves can be differentiated with the present algorithm without any segmentation and can be correlated with diffusion voxel-based metrics such as FA or MD. The visibility of the optic nerve, chiasm and tract by an analysis of eigenvectors and eigenvalues and an optimized assignment of visual components that include segments length, opacity and color depth which together enhance the visibility of the fiber structures. As shown, the images generated by the presented algorithm clearly show significant differences between the atrophic and healthy optic nerves from the eyeball to the optic chiasm and the σ parameter in the algorithm provides a quantitative measure of nerve atrophy. The estimation of the parameter on 21 non-atrophic optic nerve show reasonably good reproducibility since the standard deviation is ten times smaller than its average value.

Decreased FA and increased MD found in the optic nerve with progressive optic neuropathy coincide with the values reported for amblyopathy, glaucoma, optic neuritis, retinitis pigmentosa and multiple sclerosis, what has been shown by many studies, and the proposed method may help to diagnose such diseases.

The described approach may be a helpful complement to existing tractography methods not only of the optic nerve, but also other nerves having substantially fibrous shape, for example an auditory nerve, an oculomotor nerve, a trigeminal nerve, a vestibulocochlear nerve, white matter of a brain or a spinal cord.

The invention claimed is:

1. A computer-implemented method of diagnosing degree of neuropathy of a nerve by diffusion tensor mapping, said method comprising the following steps:
   a) acquiring diffusion tensor imaging, DTI, digital images of the nerve based on magnetic resonance, MR, data of a part of a body comprising said nerve,
   b) for each voxel in said DTI digital images calculating a diffusion tensor $\hat{D}$ $$\hat{D} = \begin{bmatrix} D_{xx} & D_{xy} & D_{xz} \\ D_{yx} & D_{yy} & D_{yz} \\ D_{zx} & D_{zy} & D_{zz} \end{bmatrix},$$

and finding eigenvalues $L_1 > L_2 > L_3$ of the diffusion tensor $\hat{D}$:

$$\hat{L} = \begin{bmatrix} L_1 & 0 & 0 \\ 0 & L_2 & 0 \\ 0 & 0 & L_3 \end{bmatrix}$$

c) selecting a region of interest in at least one of said DTI digital images, said region of interest comprising pixels,
   d) calculating a threshold value $\sigma_{th}$ of a cutoff parameter $\sigma$, ranging from 0 to $L_1$, as a minimal value of $\sigma$ for which the following cutoff condition $$L_1 \geq RD + \sigma$$

is false for all pixels within the region of interest, wherein RD is a radial diffusivity defined as $$RD = (L_2 + L_3)/2, \text{ and}$$

e) identifying and displaying, from line segments associated with a first eigenvector in each voxel, only line segments for which an axial diffusivity exceeds a radial diffusivity by more than the threshold value $\sigma_{th}$, wherein the method is independent of a type of MRI machine that acquired the MR data.

2. The method according to claim 1, wherein said nerve is a human or an animal nerve.

3. The method according to claim 1, wherein said nerve is an optic nerve, an auditory nerve, an oculomotor nerve, a trigeminal nerve, a vestibulocochlear nerve, white matter of a brain or a spinal cord.

4. The method according to claim 1, wherein acquisition of said DTI digital images in step a) is conducted for no more than 15 minutes.

5. The method according to claim 1, wherein said nerve is an optic nerve and wherein the method comprises the following additional steps, performed after step b) and before step c):
   b1) for each voxel in said DTI digital images calculating fractional anisotropy FA, mean diffusivity MD, and radial diffusivity RD, wherein:

$$FA = \frac{(L_1 - L_2)^2 + (L_2 - L_3)^2 + (L_1 - L_3)^2}{2(L_1^1 + L_2^2 + L_3^2)},$$

$$MD = (L_1 + L_2 + L_3)/3,$$

$$RD = (L_2 + L_3)/2,$$

b2) associating—with the first eigenvector in each voxel—a line segment representing a main direction of the diffusion tensor in the voxel, said line segment having a length, an opacity and an RGB color assignment,
   b3) for each line segment—adjusting the line segment length to a value given by:

$$\alpha(L_1 - RD)^\eta,$$

wherein $\alpha$ is a scaling parameter ranging from 1 to 1000 and $\eta$ is a scaling parameter ranging from 1 to 3,
   b4) for each line segment—adjusting the line segment opacity to a value given by:

$$\beta \cdot MD \cdot FA,$$

wherein $\beta$ is a scaling parameter ranging from 1 to 1000,
   b5) for each line segment—adjusting the line segment RGB color assignment as follows:

$$\text{Red} = \gamma L_1,$$
$$\text{Green} = 1 - L_1,$$
$$\text{Blue} = 0$$

wherein $\gamma$ is a scaling parameter for setting an intensity of red color ranging from 0 to 3, thereby obtaining an adjusted three-dimensional shape of the nerve, and
   b6) projecting said adjusted three-dimensional shape of the nerve onto a transverse plane by superposing two or more layers of the adjusted three-dimensional shape on said transverse plane, thereby obtaining a planar superposed image, to be further used as an DTI digital image for steps c) and d).

6. The method according to claim 5, wherein $\alpha$ is 200.

7. The method according to claim 5, wherein $\eta$ is 2.2.

8. The method according to claim 5, wherein $\beta$ is 500.

9. The method according to claim 5, wherein $\gamma$ is 2.

10. The method according to claim 5, wherein the two or more layers in step b6) are selected such that the two or more layers are essentially parallel to an axis of the optic nerve.

11. The method according to claim 5, wherein neuropathy of the optic nerve is diagnosed for $\sigma_{th}$ lower than 0.27.

12. The method according to claim 1, wherein the digital images acquired in step a) are echo planar imaging diffusion tensor imaging, EPI DTI, digital images.

* * * * *